3,102,075
TABLETING PROCESS
Ruth Millard, Baltimore, Md., assignor to Warner-Lambert Pharmaceutical Company, Morris Plains, N.J., a corporation of Delaware
No Drawing. Filed Feb. 1, 1961, Ser. No. 86,314
4 Claims. (Cl. 167—57)

This invention relates to the production of effervescent compositions and relates more particularly to an improved process for the production of granulated, free-flowing effervescent compositions useful for the production of effervescent tablets by compression methods.

In the production of effervescent compositions which produce a lively effervescence when added to water the basic mixture employed comprises a combination of alkali metal carbonates or bicarbonates, such as the sodium, potassium or calcium compounds, singly or in admixture, together with a non-toxic dry organic acid such as tartaric, citric, or malic acid or with acid salts such as monosodium phosphate, or with a mixture of these acids. Various therapeutic and flavoring ingredients may be added to this mixture depending upon the specific type of product involved. Thus, for example, when effervescent therapeutic compositions are desired these mixtures may contain aspirin, acetyl p-aminophenol, sodium bromide, potassium bromide and caffeine as well as various other therapeutic ingredients which are to be administered in the form of an aqueous carbonated drink. Flavoring and sweetening agents may also be added. Where only a flavored carbonated beverage is desired the therapeutic ingredients are omitted and only the flavoring and sweetening agents included in the basic effervescent composition. Effervescent compositions for other uses such as denture cleansers, bath salts and sanitary disinfectants for cleaning the irregular surfaces of sanitary equipment have also been proposed.

While the above effervescent compositions may be employed in the form of a free-flowing powder or a granulated mixture the most convenient forms from the dosage or application point of view are tablets which are usually formed by compression methods. When dropped into water the acid or acids present react with the carbonate or bicarbonate to release carbon dioxide which produces the desired effervescence.

To form tablets from an effervescent mixture such as that described above, the mixture must usually be in the form of a granulation in order that it will be sufficiently free-flowing to be easily fed to the die cavity of the tableting machine employed for shaping the tablets. Powders do not flow freely and these powders must be granulated in some convenient fashion. The usual methods of preparing such free-flowing granulations include the heat fusion method, the use of steam or water injection or the use of a double granulation method.

The heat fushion method consists of mixing the particular alkali metal carbonate or bicarbonate, or mixture, with the desired organic acid or combination of acids, which mixture should include monohydrated citric acid in an amount of from about 8 to 30 percent of the total acid present, placing the mixture in a suitable container and heating until the water of crystallization in the monohydrated citric acid present is released. This treatment causes a partial reaction and results in the formation of a plastic mass which, when broken down into coarse granules and then screened, dried and lubricated, can be compressed into tablets.

The steam or water injection method of granulation is similar to the heat fusion method except that monohydrated citric acid does not have to be employed since the required moisture is added either in the form of steam or as water, which is sprayed or injected into the mixture as it is agitated. Heat is not essential in this method of forming the plastic mass which, after being broken up into coarse granules, is subsequently screened and dried. When employed for the production of tablets the granulated mixture is usually lubricated and the lubricated granulation compressed into tablets.

The double granulation method consists of preparing granules of the alkali metal carbonate or bicarbonate by moistening the latter with a solution of a binding material such as sugar, acacia, gelatin or lactose, screening the moist mixture to form granules and then drying the moist granules. A separate granulation is made in a like manner of the acid components. The medicinal or flavoring ingredients are then incorporated into either granulation or divided between said granulations, and the two granulations are then mixed in the proper formula proportions. For tablet formation by compression, the granulation mixture is lubricated prior to compression.

Attempts have been made to avoid the necessity for relying upon these preliminary granulation procedures by employing both the alkali metal bicarbonate and the organic acid in an available granular form, that is, in particles of from about 20 to 100 mesh.

Where the product is to be packaged in a free-flowing granular form and the desired dosage is obtained with a measured amount of the granulation, the above granulation procedures are preferred since they produce the relatively large granules which have found wide consumer acceptance. There is less necessity for utilizing a prior granulation procedure when effervescent tablets are to be formed from these effervescent compositions since both the alkali metal carbonate or bicarbonate and the organic acids are each commercially available in free-flowing granular form in which the individual particles are from about 20 to 100 mesh in size. Suitable free-flowing mixtures of these granular materials with the desired therapeutic agents or flavoring materials added may be tableted directly. However, the mere mixing together of the granular alkali metal carbonate or bicarbonate and the granular organic acid with various ingredients does not yield a composition that will produce entirely satisfactory tablets when fed directly to a tablet press. One of the major difficulties experienced, and one which is not entirely overcome even with the addition of a lubricant to these mixtures, is their tendency to stick to the punches when shaping the tablets by compression methods.

It is, therefore, an important object of this invention to provide a process for the preparation of free-flowing granular compositions suitable for the production of effervescent tablets by compression methods which may be readily processed in the usual tablet press without undesirable sticking and the like.

Other objects of this invention will appear from the following detailed description.

It has now been found that a free-flowing granular effervescent composition suitable for tableting operations and comprising a mixture of a granular alkali metal carbonate or bicarbonate with a granular non-toxic organic acid may be obtained if a predetermined aliquot portion of the granular components employed in forming said composition is first mixed with from 0.075 percent to 0.15 percent by weight of water based on the weight of the total batch and the wetted premix thus formed is then combined with a dry mixture of the remainder of said active components comprising the batch, said mixture preferably containing an amino acid. After the desired flavoring agents, therapeutic agents or both are added to the granular mixture together with a vegetable oil or mineral oil lubricant, the granular mixture formed may then be employed directly for forming tablets by compression methods. This free-flowing granular mixture may then be employed in tableting operations in the usual high speed rotary tablet presses without sticking to the punches or exhibiting any other undesirable processing difficulty.

The aliquot of the total alkali metal carbonate or bicarbonate and non-toxic organic acid treated with water prior to mixing with the remainder of the dry, granular components may vary from about 5 to 15 percent by weight of the total batch with the water added to this aliquot being preferably from about 0.05 to about 0.15 percent by weight of the total batch.

The amino acid added to the dry mixture of components may be, for example, glycine or alanine and may be present in an amount of from 1.25 to 3 percent by weight of the total batch.

The specific mixing procedure employed yields a lubricated granular mixture quite satisfactory for tableting and free from sticking problems whereas an ordinary blending procedure utilizing the same basic components is found to yield a granular mixture in which the tableting operation is seriously complicated by reason of the frequent sticking to the tableting punches which is encountered.

In order further to illustrate this invention but without being limited thereto the following example is given:

*Example*

To a thoroughly blended dry mixture of 33.43 kg. of granular sodium bicarbonate, 47.81 kg. of granular anhydrous citric acid and 1.5 kg. of glycine to which has been added 0.55 liters of edible vegetable oil is added a blended mixture of 3.5 kg. of granular sodium bicarbonate, 3.5 kg. of granular anhydrous citric acid and 65 ml. of water. After thorough mixing, 5.71 kg. of sodium cyclamate are added and blended in together with 1.16 kg. of soluble saccharin, 0.975 kg. of ascorbic acid, 2.14 kg. of cherry flavoring and 0.275 kg. of red coloring. After thorough blending another 0.55 liter of said edible vegetable oil is added. The granular mixture is then compressed into tablets weighing 2.26 grams and having a hardness of 3 to 5 on the Strong-Cobb scale (see U.S. Patent No. 2,645,936). The tablets are then heated for two hours at 190° F. to improve their physical hardness and stability prior to packaging.

The mixing and blending procedure described produces a granulation which is easily tableted and which exhibits an unusual degree of freedom from sticking to the punches.

It is understood that the foregoing detailed description is given merely by way of illustration and that many variations may be made therein without departing from the spirit of my invention.

Having described my invention, what I desire to secure by Letters Patent is:

1. Process for the production of granular effervescent compositions having improved tableting properties, which comprises forming a mixture of a member of the group consisting of a granular alkali metal carbonate and granular alkali metal bicarbonate with a granular non-toxic organic acid, wetting said mixture with from 0.05 to 0.15 percent by weight of water based on the total batch weight, and then combining said wetted mixture with a lubricated dry mixture of a non-toxic organic acid containing an amino acid and a member of the group consisting of the granular alkali metal carbonate and the granular alkali metal bicarbonate, said mixture which is wetted comprising from 5 to 15 percent by weight of the total combined effervescent composition.

2. Process in accordance with claim 1 wherein said effervescent mixture comprises sodium bicarbonate and citric acid.

3. Process in accordance with claim 2 wherein the amino acid in the granular mixture is glycine.

4. Process in accordance with claim 1 wherein the lubricant in the lubricated dry mixture is a member of the group consisting of vegetable oil and mineral oil.

References Cited in the file of this patent

UNITED STATES PATENTS

| | | |
|---|---|---|
| 2,883,327 | Dale | Apr. 21, 1959 |
| 2,971,889 | Swintosky | Feb. 14, 1961 |
| 2,985,562 | Millard et al. | May 23, 1961 |
| 2,999,293 | Taff et al. | Sept. 12, 1961 |